United States Patent
Doerr et al.

(10) Patent No.: US 8,777,180 B2
(45) Date of Patent: Jul. 15, 2014

(54) SOLENOID VALVE

(75) Inventors: Ralf Doerr, Ingelfingen (DE); Heiko Engler, Forchtenberg (DE); Martin Ottliczky, Forchtenberg (DE); Sebastian Kahl, Forchtenberg (DE)

(73) Assignee: Buerkert Werke GmbH, Ingelfingen (DE)

( * ) Notice: Subject to any disclaimer, the term of this patent is extended or adjusted under 35 U.S.C. 154(b) by 136 days.

(21) Appl. No.: 13/411,382

(22) Filed: Mar. 2, 2012

(65) Prior Publication Data
US 2012/0223264 A1 Sep. 6, 2012

(30) Foreign Application Priority Data
Mar. 3, 2011 (DE) .............. 20 2011 003 471 U

(51) Int. Cl.
*H01F 7/11* (2006.01)
*H01F 5/00* (2006.01)
*F16K 11/052* (2006.01)
*F16K 31/06* (2006.01)

(52) U.S. Cl.
USPC ............ 251/129.09; 137/625.44; 335/136; 335/267; 335/268

(58) Field of Classification Search
USPC ........ 137/625.4, 625.44; 251/129.01, 129.02, 251/129.03, 129.09; 335/266, 267, 268, 335/136
See application file for complete search history.

(56) References Cited

U.S. PATENT DOCUMENTS

| | | | | |
|---|---|---|---|---|
| 1,940,586 A | * | 12/1933 | Fereday | 335/239 |
| 2,436,224 A | * | 2/1948 | Ogle | 361/210 |
| 2,570,450 A | * | 10/1951 | Hottenroth | 251/129.2 |
| 2,824,189 A | * | 2/1958 | Zimmer | 335/125 |
| 2,853,090 A | * | 9/1958 | Hanna et al. | 137/82 |
| 3,991,788 A | * | 11/1976 | Kull | 137/863 |
| 4,097,833 A | * | 6/1978 | Myers | 335/261 |
| 4,268,009 A | * | 5/1981 | Allen, Jr. | 251/129.2 |
| 4,344,603 A | * | 8/1982 | Hozumi et al. | 251/129.03 |
| 4,450,863 A | * | 5/1984 | Brown | 137/613 |
| 4,527,590 A | * | 7/1985 | Kolze | 137/596.17 |
| 4,560,969 A | * | 12/1985 | Nicholson | 335/272 |
| 4,601,458 A | * | 7/1986 | Sheppard | 251/129.19 |
| 4,765,370 A | * | 8/1988 | Ariizumi et al. | 137/625.65 |
| 5,443,093 A | * | 8/1995 | Stoll et al. | 137/596.17 |

(Continued)

FOREIGN PATENT DOCUMENTS

| | | |
|---|---|---|
| DE | 100 03 205 A1 | 11/2000 |
| DE | 100 38 306 A1 | 9/2001 |

(Continued)

OTHER PUBLICATIONS

German Patent and Trademark Office Search Report for Pat. Appl. 20 2011 003 471.2, dated Jul. 14, 2011 (5 pages).

*Primary Examiner* — John K Fristoe, Jr.
*Assistant Examiner* — Frederick D Soski
(74) *Attorney, Agent, or Firm* — Steven McMahon Zeller; Dykema Gossett PLLC

(57) ABSTRACT

A solenoid valve comprising a magnetic drive having at least two parallel coils which are arranged with their end faces lying between two spaced apart magnetic yoke plates, a stationary magnetic plug and an axially movable magnetic core each being arranged in each coil which together with the magnetic yoke plates form a ferromagnetic circuit. At least one further magnetic element which is firmly connected to a respective yoke plate on two opposite ends is arranged between the magnetic plates.

11 Claims, 6 Drawing Sheets

(56) References Cited

U.S. PATENT DOCUMENTS

| | | | |
|---|---|---|---|
| 5,462,344 A * | 10/1995 | Jakob et al. | 303/119.3 |
| 5,703,559 A * | 12/1997 | Emmerich et al. | 336/234 |
| 5,967,186 A * | 10/1999 | Grueninger | 137/625.65 |
| 6,273,122 B1 * | 8/2001 | Schudt et al. | 137/315.03 |
| 6,526,928 B2 * | 3/2003 | Bauer et al. | 123/90.11 |
| 6,532,758 B2 * | 3/2003 | DuHack | 62/340 |
| 6,701,606 B2 * | 3/2004 | Smith et al. | 29/602.1 |
| 7,305,943 B2 * | 12/2007 | Norton | 123/90.11 |
| 7,308,909 B2 * | 12/2007 | Kish, Jr. | 137/596.2 |
| 2004/0222397 A1 * | 11/2004 | Hayashi | 251/129.09 |
| 2004/0239178 A1 * | 12/2004 | Otsuka | 303/119.3 |
| 2005/0236595 A1 * | 10/2005 | Miyazoe et al. | 251/129.09 |
| 2010/0123093 A1 | 5/2010 | Beyer et al. | |
| 2010/0252760 A1 | 10/2010 | Hettinger | |
| 2011/0155963 A1 | 6/2011 | Choi | |

FOREIGN PATENT DOCUMENTS

| | | |
|---|---|---|
| DE | 20 2007 012 652 U1 | 11/2007 |
| DE | 10 2007 040 456 A1 | 11/2008 |
| DE | 20 2008 015 303 U1 | 4/2009 |
| DE | 10 2006 006 031 A1 | 12/2009 |
| DE | 10 2008 027 395 A1 | 12/2009 |

* cited by examiner

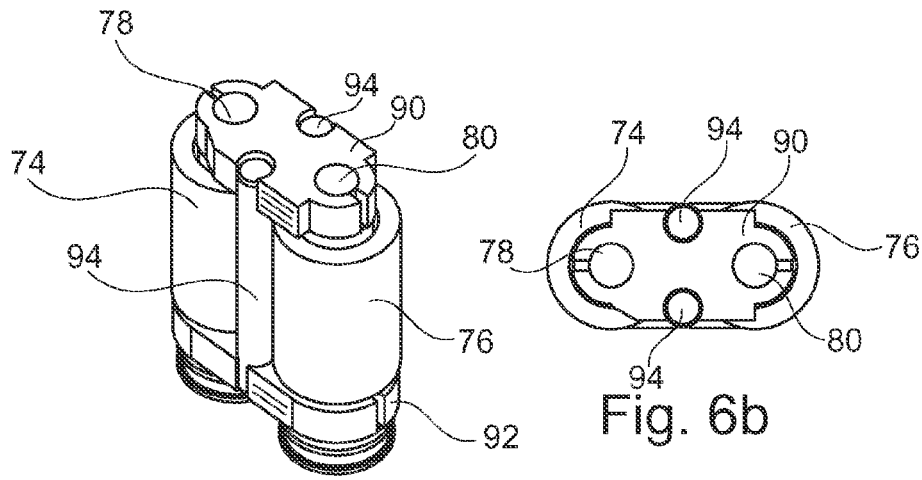
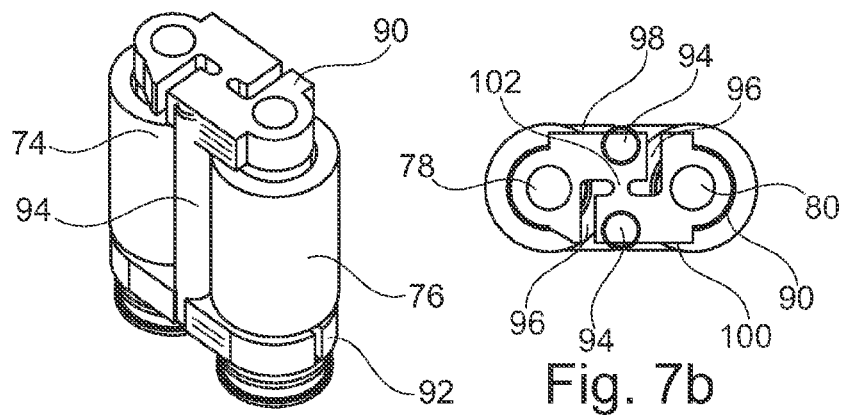
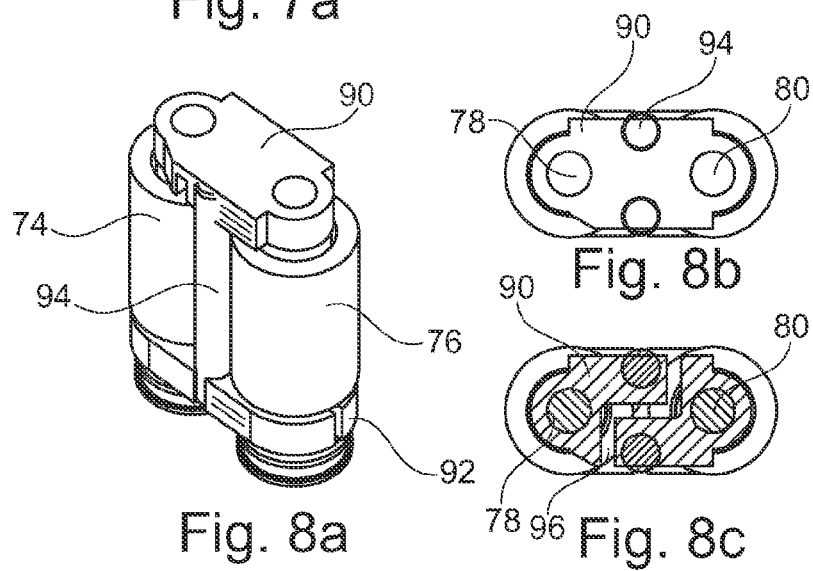

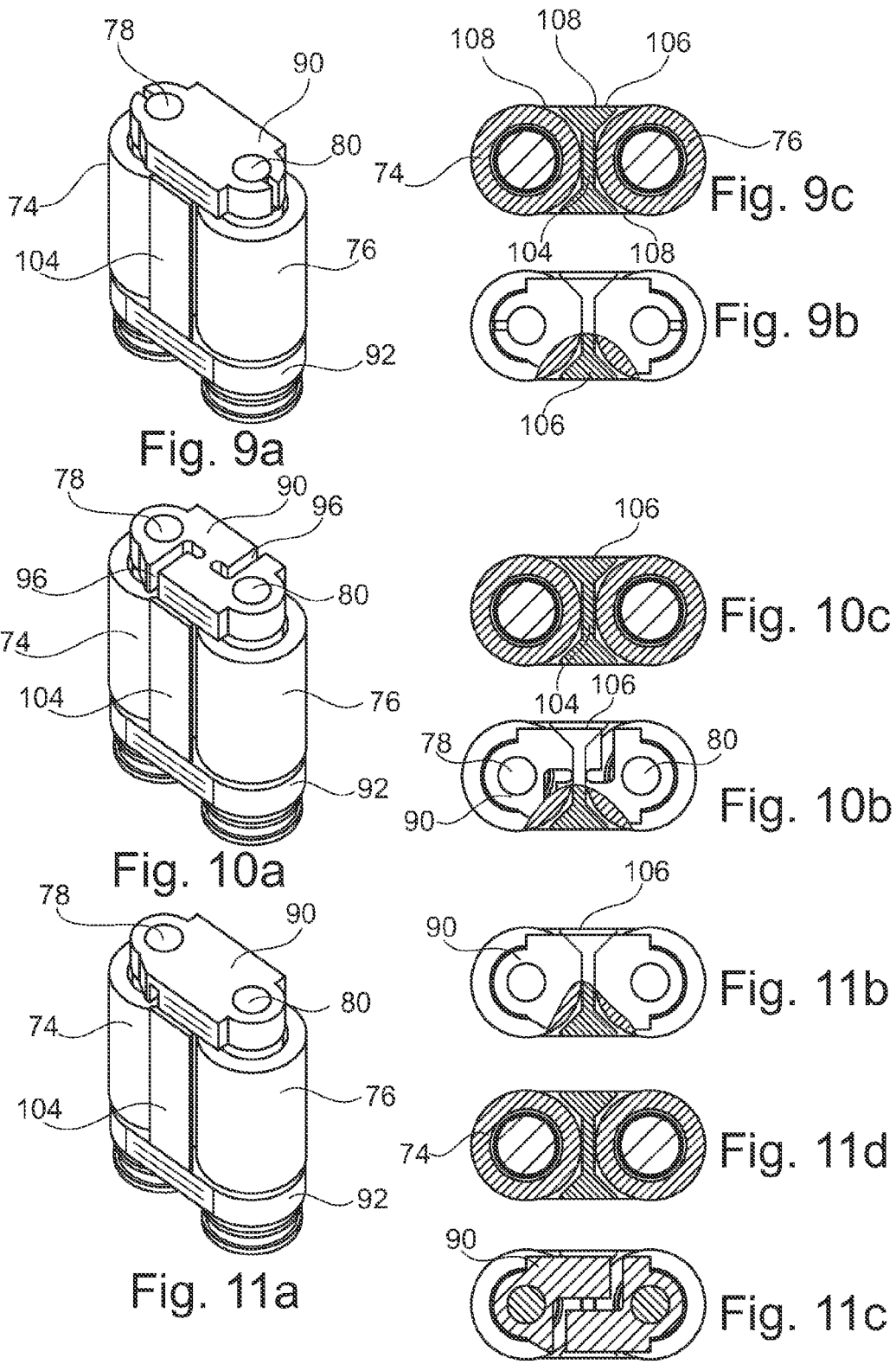

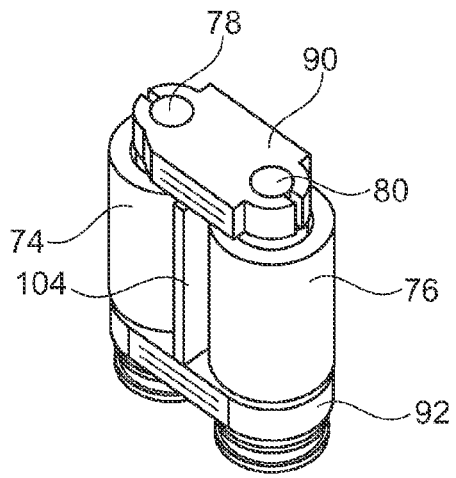
Fig. 12a
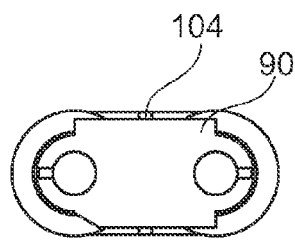
Fig. 12b
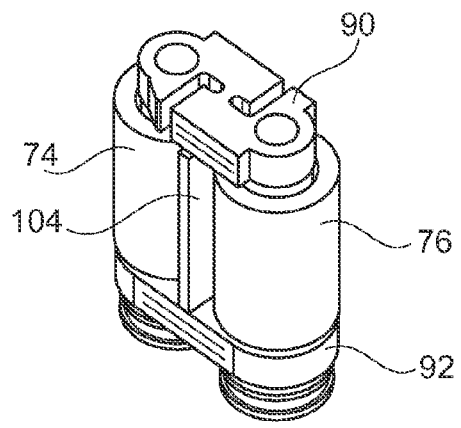
Fig. 13a
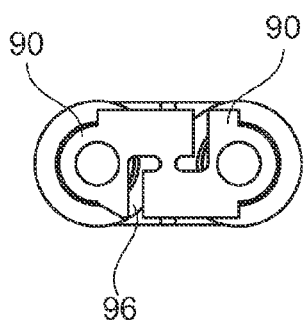
Fig. 13b
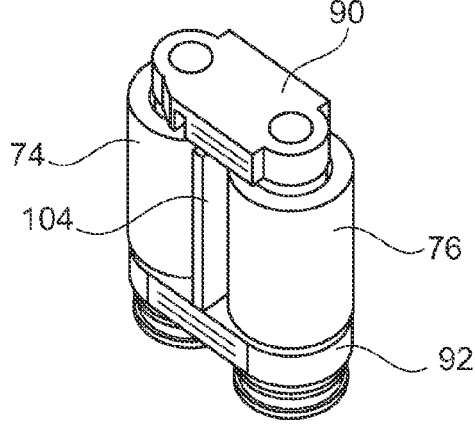
Fig. 14a
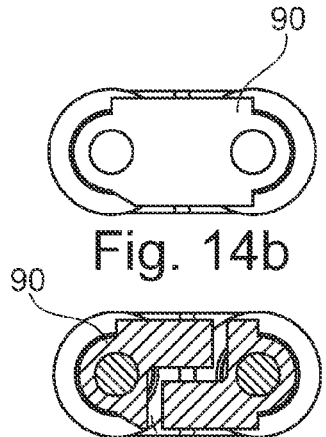
Fig. 14b
Fig. 14c

SOLENOID VALVE

CROSS REFERENCE TO RELATED APPLICATIONS

This application claims priority to German patent application 202011003471.2 filed 3 Mar. 2011. This German application is hereby incorporated by reference as though fully set forth herein.

TECHNICAL FIELD

The invention relates to a solenoid valve comprising a magnetic drive having at least two parallel coils which are arranged on the end face between two spaced apart magnetic yoke plates, a stationary magnetic plug and an axially movable magnetic core being arranged in each coil which together with the magnetic yoke plates form a ferromagnetic circuit.

BACKGROUND OF THE INVENTION

Solenoid valves having two coils are known. The purpose of using two coils in solenoid valves which have a movable armature often consists in providing within a short time a high pull-in voltage at the turn-on instant and then to reduce the latter to a hold voltage to save power. Part of the winding is turned off, wherein the windings may both be placed one on top of the other, next to each other or in one another on one or separate coil bodies.

In case two coils having two movable armatures in one common magnetic circuit are used in a solenoid valve, a magnetic core of one coil may undesirably be attracted upon application of a voltage across the other coil.

The present invention provides a solenoid valve comprising a magnetic drive which has two coils and a respective magnetic core movable therein, the coils being adapted to be piloted independently of each other. The invention further provides a solenoid valve having a design as compact as possible with small external dimensions.

BRIEF SUMMARY OF THE INVENTION

The solenoid valve according to the present invention comprises a magnetic drive having two spaced apart magnetic yoke plates, at least two parallel coils having end faces and being arranged with their end faces to lie between the two spaced apart magnetic yoke plates, at least one stationary magnetic plug, at least an axially movable magnetic core, a stationary magnetic plug and an axially movable magnetic core both being arranged in each coil, the at least one magnetic plug and the at least one magnetic core together with the magnetic yoke plates forming a ferromagnetic circuit, and at least one further magnetic element having opposite ends, being firmly connected to a respective yoke plate on each of its opposite ends, more particularly at opposite ends, and being arranged between the magnetic yoke plates. Due to the further magnetic element, the magnetic force available in the ferromagnetic circuit is advantageously increased.

Furthermore, the additional magnetic element permits the realization of principally magnetic field lines between a coil and the further magnetic element when this coil is supplied with current. Though a small stray flux may occur towards the second coil, only the magnetic core in the coil supplied with current is attracted. The coils are thus adapted to be piloted independently of each other.

In a preferred embodiment, the at least one magnetic element is arranged between the coils. This has the advantage that the same magnetic element can be used for both coils to form a magnetic circuit between one coil and the magnetic element without involving the second coil. Two separate magnetic circuits are thus obtained, and the coils can be piloted separately.

A further advantage is that the arrangement of the magnetic element between the coils permits a space-saving design.

Alternatively, two magnetic elements may be used, one element being respectively adjacent to a coil. If enough space is available, it is also possible that one respective magnetic element is arranged outside next to each coil rather than between the coils.

The magnetic element is preferably configured as a rectangular magnetic plate. The manufacture of a magnetic plate is simple and cost-effective. For a high magnetic density, it is convenient if the magnetic plate fills the room between the coils in optimal way, i.e. its width is adapted to the coil diameters and its depth to the distance between the coils.

In an embodiment, the rectangular magnetic plate presents wedge-shaped, thickened longitudinal edges which extend over the entire length. Due to this geometric design, the magnetic circuit is further amplified in that the volume of the magnetic plate is increased and the room between the coils is filled as optimally as possible with magnetic material.

Instead of a rectangular magnetic plate, it is also possible to arrange two parallel magnetic yoke bolts between the coils. The magnetic yoke bolts can be manufactured from bars in a simple and cost-effective manner.

A further advantage is that the magnetic yoke bolts can be connected to the magnetic yoke plates in a simple manner. Their ends preferably project in recesses within the magnetic yoke plates.

It is particularly convenient if the ends of the yoke bolts protrude through the recesses in the magnetic yoke plates. In this case, the magnetic field lines can extend over the entire yoke plate thickness.

For the magnetic circuit, it is particularly efficient if no air gap or an air gap which is as small as possible is present at the junction between the yoke plate and the yoke bolt. To this end, the recesses of the magnetic yoke plates are each provided with a slot pointing radially to the outside away from the adjacent coil, and the ends of the yoke bolts are pressed therein. The recess diameter is then preferably minimally smaller than the diameter of the magnetic yoke bolts.

In a further embodiment, at least one magnetic yoke plate has an axial gap between the coils. Due to this constructive measure, a possibly present stray flux to the adjacent coil is minimized. It is not important here, if the axial gap is arranged in that magnetic yoke plate which is adjacent to a fluid housing in the solenoid valve, or if this yoke plate is spaced apart from the fluid housing.

It is also possible that both magnetic yoke plates present an axial gap.

The axial gap preferably extends from a longitudinal edge of the yoke plate and runs about a yoke bolt as viewed in the axial direction, which further favors a separation of the magnetic circuits.

Advantageously, two gaps extend from opposite longitudinal edges and run along the magnetic element to then approach each other. In this way, the magnetic yoke plate is not entirely divided into two components but remains in one piece, which is advantageous upon mounting. Otherwise, the two yoke plate pieces would have to be mounted separately and would have to be adjusted to each other.

It is convenient for the manufacture that the gaps have an L-shaped geometry.

In a further embodiment, the magnetic yoke plates are configured in several layers, which counteracts eddy currents in case alternating voltage is used.

It is furthermore advantageous to provide the magnetic yoke plates as sheet stacks, which in turn favors a cost-effective manufacture.

In the multilayered configuration, the individual layers can differ from each other with respect to their geometry and/or their material. It is then possible to realize in simple manner an embodiment in which the axial gap does not extend continuously over the entire magnetic yoke plate thickness but only through some sheet metal layers. The sheet metal layer without gap stabilizes the structure of the sheet stack, in particular also in case the gap extends entirely through the yoke plate layers which without the gap-free sheet metal layer would require a two-piece magnetic yoke plate as the gap extends over the entire width. The gap-free sheet metal layer then assumes a retaining function for the sheet metal layers having a gap, which in turn favors a simple mounting. The same geometry can however also be manufactured in one piece using a machining process.

The gap-free sheet metal layer is in particular made of a non-magnetic material. It advantageously forms a termination pointing away from the magnetic circuit, as a result of which a complete separation of the magnetic circuits of both coils is obtained.

The magnetic drive described above is preferably firmly connected to a fluid housing having two actuating elements which are each actuated by a magnetic core associated therewith. The magnetic coils which can be piloted separately advantageously permit a separate actuating of the two actuating elements.

In a preferred embodiment, the movable magnetic cores project through recesses in the fluid housing to move the actuating elements.

BRIEF DESCRIPTION OF THE DRAWINGS

FIGS. 6a and 6b show a perspective view and a top view, respectively, of a possible variant of the magnetic drive which can be used in the solenoid valve according to the invention.

FIGS. 7a and 7b show a perspective view and a top view, respectively, of a further embodiment of the magnetic drive.

FIGS. 8a to 8c show a perspective view, a top view and a sectional view, respectively, of a further embodiment of the magnetic drive which can be used in the invention.

FIGS. 9a to 9c show a perspective view, a top view and a sectional view, respectively, of a further embodiment of the magnetic drive which can be used in the invention.

FIGS. 10a to 10c show a perspective view, a top view and a sectional view, respectively, of a further embodiment of the magnetic drive which can be used in the invention.

FIGS. 11a to 11d show a perspective view, a top view and two sectional views at two different axial heights, respectively, of a further embodiment of the magnetic drive which can be used in the invention.

FIGS. 12a and 12b show a perspective view and a top view, respectively, of a further embodiment of the magnetic drive which can be used in the invention.

FIGS. 13a and 13b show a perspective view and a top view, respectively, of a further embodiment of the magnetic drive which can be used in the invention.

FIGS. 14a to 14c show a perspective view, a top view and a sectional view, respectively, of a further embodiment of the magnetic drive which can be used in the invention.

DETAILED DESCRIPTION OF PREFERRED EMBODIMENTS

Figure 1:
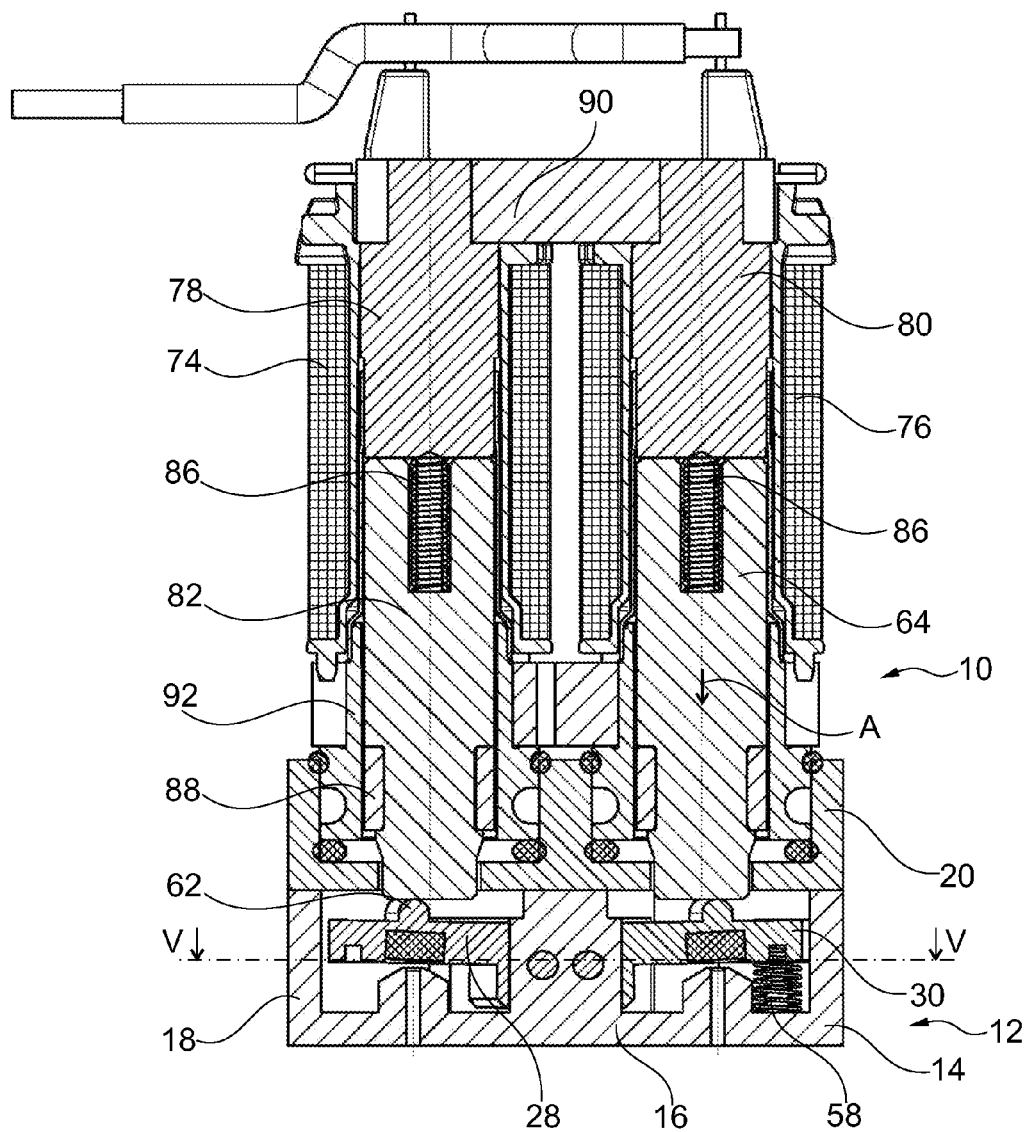
FIG. 1 shows a longitudinal sectional view through a solenoid valve according to the invention.

FIG. 1 shows a solenoid valve having substantially two portions, namely a magnetic drive 10 and an actuating unit 12.

The solenoid valve has an extremely small structure and is represented in an excessively large manner in FIG. 1. In practice, the solenoid valve according to the invention has a width of only about 7 to 10 mm.

The solenoid valve is configured as a double 3/2 directional valve in which both valves can be actuated independently of each other.

The actuating unit 12 comprises a preferably integral fluid housing 14 having a bottom 16 and a surrounding lateral wall 18. Towards the top, the housing 14 is closed by a cover 20 as part of the magnetic drive 10. The interior of the housing 14 can be taken most easily from FIG. 2. An intermediate wall 22 integrally adjoining the bottom 16 and the lateral wall 18 extends diagonally through the cuboidal housing 14.

The intermediate wall 22 divides the hollow interior of the housing 14 into two control chambers 24, 26 which are preferably, but not necessarily fluidically separated from each other and which are each associated with a 3/2 directional valve. Alternatively, more than two 3/2 directional valves can also be accommodated in one housing 14.

Figure 3:
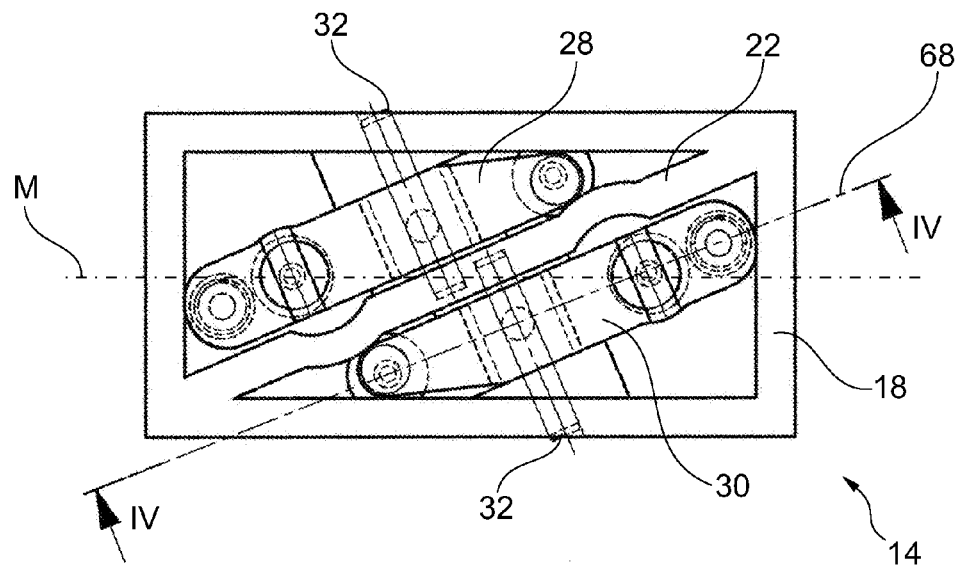
FIG. 3 shows a top view onto the valve housing shown in FIG. 2, the valve drive being removed.

Two valve bodies, hereinafter referred to as actuating elements 28 and 30, respectively, are entirely accommodated in the control chambers 24, 26. The actuating elements 28, 30 are two-armed levers (see FIG. 4) which are each mounted in the housing 14 via a bearing pin 32 the imaginary center of which forms the pivoting axis. The pins 32 are pressed from the outside into bores in the lateral wall 18 and in the intermediate wall 22, as can be seen in FIGS. 3 and 5. The pins 32 run parallel or coaxially to each other. In the example embodiment represented, they are parallel.

Figure 4:
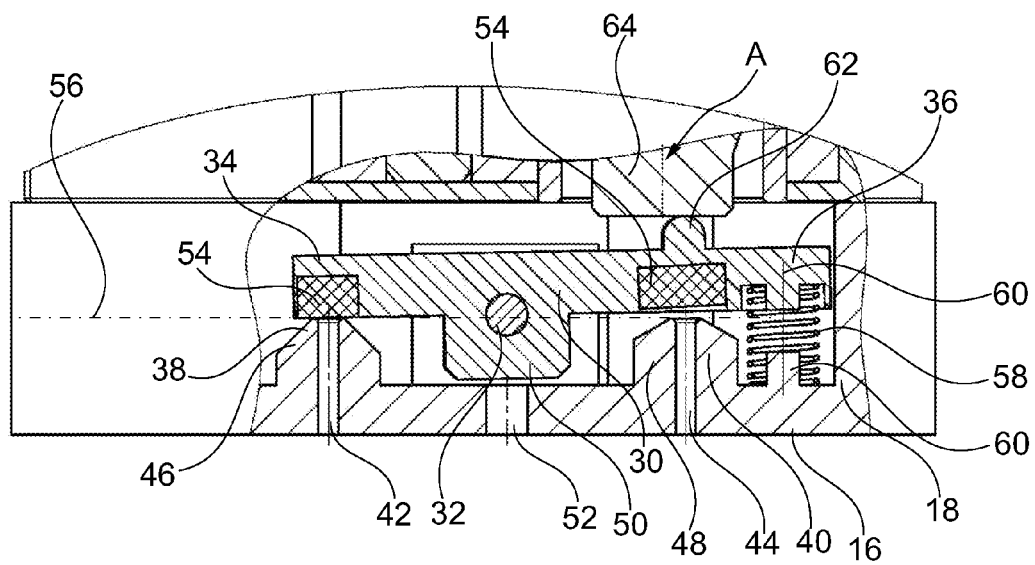
FIG. 4 shows an enlarged view of the housing shown in FIG. 3 along the line IV-IV.
Figure 5:
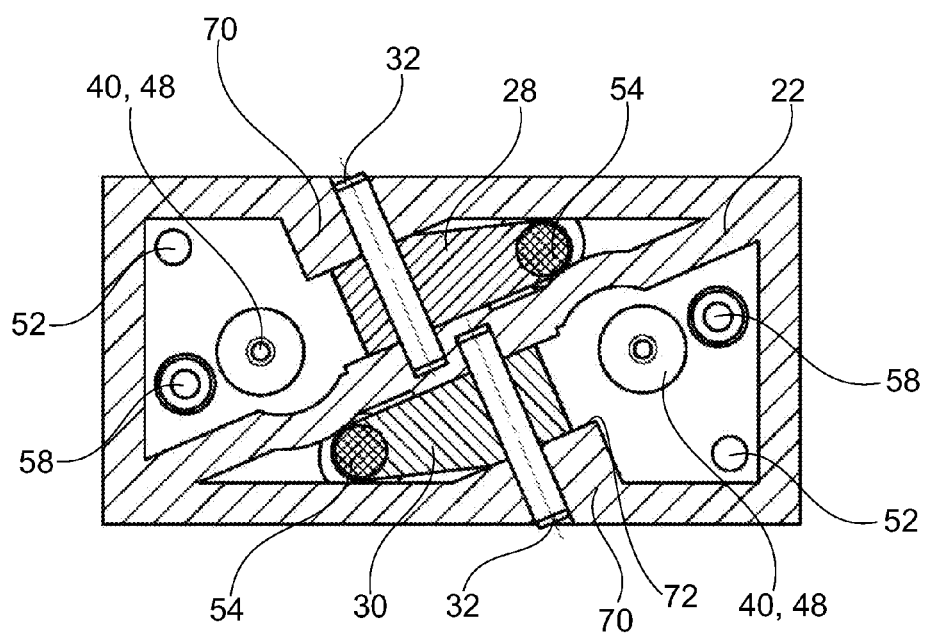
FIG. 5 shows a sectional view through the solenoid valve along the line V-V in FIG. 1.

In FIG. 4 it can be seen that the lever arms 34, 36 have different lengths.

Each actuating element 28, 30 cooperates with two valve seats 38, 40 associated with flow channels 42, 44 which open into the control chamber 24 or 26. Cone-shaped projections 46, 48 extend from the bottom 16 towards the actuating element 28, 30. The flow channels 42, 44 which open at the top of the respective projections 46, 48 extend coaxially through the projections 46, 48. Around the mouth, the projection 46, 48 is provided with a ring-shaped surface which forms the valve seat 38 and 40, respectively.

In the embodiment shown, the distances of the two valve seats 38, 40 from the imaginary pivoting axis of the bearing pin 32 are equal but could also be different.

For a better stability of the actuating element 30 in the region of the bearing pin 32, the actuating element 30 presents a projection 50 which is also referred to as bearing lug. The same applies to the actuating element 28.

FIG. 4 also shows a flow channel 52 which is however preferably remote from the actuating element 28, 30, as shown in FIG. 5.

Each control chamber 24, 26 thus has a total of three flow channels opening therein, namely the flow channels 42, 44, 52. Two of these three flow channels, namely flow channels 42, 44, can be closed by the actuating element 28 or 30.

The rocker-like actuating element 30 has on its face associated with the valve seats 38, 40 one respective sealing element 54 made of elastomer which provides for an increased sealing when the actuating element 28, 30 rests against the valve seat 38 or 40. The two valve seats 38, 40 define a common plane 56 in which the central axis of the bearing pin 32 should also be arranged (see FIG. 4). This is however merely an advantageous option.

The two actuating elements 28, 30 preferably have an identical shape, they are merely mounted in their respective control chambers 24, 26 rotated through 180°.

The actuating elements 28, 30 are elongated, bar-like bodies which extend in particular parallel to the intermediate wall 22 over nearly the entire diagonal length of the control chambers 24, 26.

A spring 58 is mounted between the longer lever arm 36, more precisely between its free axial end and the bottom 16, the spring biasing the actuating element 30 anticlockwise and pressing the latter against the valve seat 38 with respect to FIG. 4.

For a better support of the spring 58, both the lever arm 36 and the bottom 16 are provided with retaining geometries 60 which constitute pin-like projections.

On the face opposite to the valve seats 38, 40, the actuating element 28, has an engagement surface 62 which has a semicircular cross-section and is in particular configured in the form of a web. This is clearly visible in FIG. 2.

When the flow channel 44 is closed, the engagement surface 62 is positioned exactly above the valve seat 40, i.e. the corresponding faces are oriented to each other.

The engagement surface 62 is important for the low-friction contact with an actuator in the form of a movable magnetic core 64 of the magnetic drive 10. The magnetic core 64 has on the side of the end face a plane counter-contact surface via which it can rest against the engagement surface 62.

Alternatively, the two contact surfaces can however also be configured such that the engagement surface 62 at the actuating element 28, 30 is configured in a plane manner and the end face of the magnetic core 64, 82 has a hemispherical geometry.

The magnetic core 64 is movable in a longitudinal or axial direction A (see FIG. 1).

The spring 58 is also oriented in this axial direction A. Furthermore, the flow channels 42, 44 extend in the axial direction A.

Figure 2:
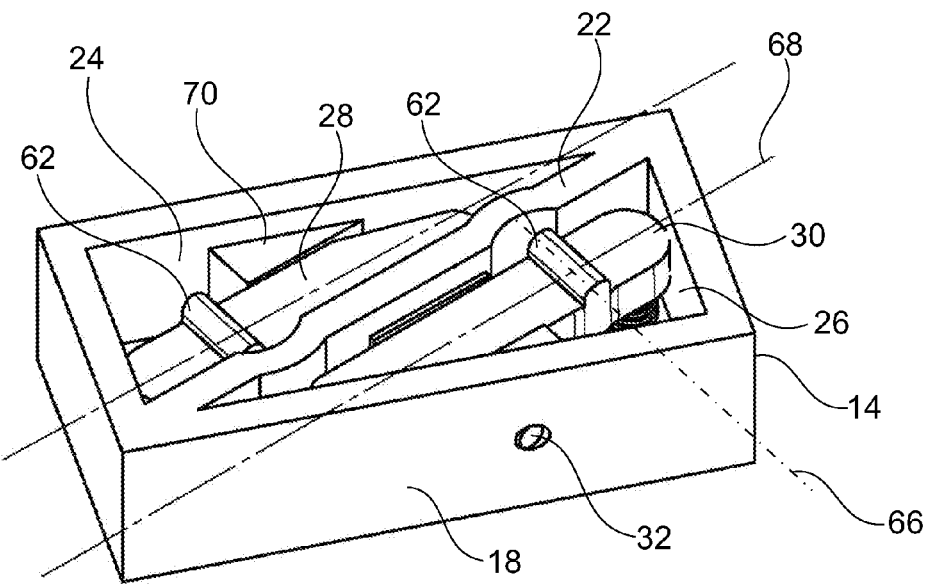
FIG. 2 shows a perspective view of the solenoid valve with the drive removed.

The orientation of the web-like engagement surface 62 with respect to the imaginary central axis of the flow channel 44 is preferably realized such that the central axis of the flow channel 44 and thus also the central axis of the valve seat 40 intersects the longitudinal central axis 66 of the web shown in FIG. 2, and this with respect to the closed valve position at the flow channel 44.

In more general terms, in the closed position, the resultant of the actuating force through the magnetic core 64 acting on the engagement surface 62 should intersect the so-called closing surface perpendicularly. The closing surface is defined by the outer periphery of the ring-shaped valve seat 40 and defines in turn a circular area which is referred to as closing surface.

As can furthermore be seen in FIGS. 1 and 4, the engagement surface 62 is offset to the central axis of the magnetic core 64 so that the magnetic core 64 is positioned further inside in order to realize a higher compactness of the magnetic drive 10. The contact between the engagement surface 62 and the lower end face of the magnetic core 64 is arranged closer to the free end of the lever arm 36 with respect to the central axis of the magnetic core 64.

Further characteristics of the actuating unit 12 are its low height with respect to the axial direction A. This low height is obtained by the parallel arrangement of the actuating elements 28, 30 which are substantially placed in one plane. This means that with respect to the axial direction A, they are not arranged one on top of the other but next to each other, as can be seen in FIG. 1. The pivoting axes of the bearing pins 32 are thus preferably arranged in a common plane which is perpendicular to the axial direction A.

The simple mounting and the secure support of the actuating elements 28, 30 are also improved by the mounting of the actuating elements 28, 30 in the longitudinal direction of the bearing pins 32, because integrally formed wedge-shaped and inwardly pointing guiding projections 70 having a guiding surface 72 project from opposite walls 18 (see FIG. 5), the guiding surface extending parallel to the opposite face of the intermediate wall 22.

The actuating elements 28, 30 are thus mounted between opposite guiding surfaces so as to be secured against an axial displacement.

The magnetic drive 10 which is represented in FIG. 1 is a pre-mounted self-contained unit which after its mounting and completion is put on the actuating unit 12 that is also configured as a pre-mounted unit.

The magnetic drive 10 comprises two parallel coils 74, 76 each surrounding a magnetic plug 78, 80 at their end opposite to the actuating unit 12. Axially movable armatures, hereinafter referred to as magnetic cores 82, 64, are also accommodated in the interior of the coils 74, 76 and are biased by springs 86 towards the actuating unit 12 opposite to the respective magnetic plug 78, 80. The magnetic cores 82, 64 project through openings in the cover 20 into the interior of the housing 14 and press in the initial position against the convex engagement surfaces 62 of their respective actuating element 28 or 30. However, in the initial position, when the coil 74, 76 is not supplied with current, the respective actuating element 28, 30 is pivoted such that it is removed from the valve seat 40 and rests on the valve seat 38 as the springs 58 are configured so as to be weaker than the springs 86.

Reference number 88 refers to a sliding element which counteracts frictional forces possibly occurring upon movement of the magnetic cores 82, 64 within the sleeves surrounding them.

FIG. 1 also shows that the magnetic drive 10 also has a very compact structure. As viewed in the axial direction A, it does not project on any face from the basal face of the housing 14.

The two coils 74, 76 can be actuated independently of each other, which means that the two 3/2 directional valves formed by the actuating elements 28, 30 can also be actuated independently of each other. This independent actuation is possible due to the fact that each drive has its own ferromagnetic circuit, the two ferromagnetic circuits being substantially decoupled from each other. This decoupling is obtained although the two magnetic plugs 78, 80 protruding at the top out of the coils 74, 76 are received in a common yoke plate 90. A common yoke plate 92 provided at the opposite end of the coils 74, 76 is furthermore present so that the yoke plates 90, 92 delimit the two parallel coils 74, 76 in the axial direction.

FIGS. 6 to 14 represent different possibilities how two ferromagnetic circuits are formed which substantially do not influence each other despite the two common yokes 90, 92.

In the embodiment according to FIG. 6a, two magnetic elements in the form of two parallel yoke bolts 94 are provided which extend parallel to the coils 74, 76 and therebetween. The yoke bolts 94, which define further magnetic elements, are firmly connected at and with its longitudinal ends to the yoke plates 90, 92. The yoke bolts 94 are extending between the opposite (inner) end faces of the yoke plates 90, 92 and are attached to the plates 90, 92 at the opposite inner end faces, e.g. by clamping or soldering, welding, etc. As can be seen in FIG. 6b, the yoke bolts 94 are arranged within the common envelope of the two coils 74, 76 and do not project to the top and to the bottom, i.e. do not project laterally with respect to FIG. 6b. The two yoke bolts 94 are magnetic and project into recesses in the two yoke plates 90, 92 to be received and fastened therein. The yoke bolts 94, along with the coils 74, 76 and the magnetic plugs 78, 80, form two ferromagnetic circuits. The stray fields of each ferromagnetic circuit are very small such that the adjacent ferromagnetic circuit remains functionally uninfluenced.

An even better decoupling of the ferromagnetic circuits is obtained by the embodiment of FIG. 7. Corresponding yoke bolts 94 are also provided here. At least the upper yoke plate 90, preferably both yoke plates 90, 92 however present gaps 96 each starting from opposite longitudinal edges 98, 100 of the yoke plates 90, 92, extending towards the opposite longitudinal edge 100 and 98, respectively, and then approaching each other without merging into each other. The gaps 96 extend from their longitudinal edges 98, 100 not exactly opposite towards each other but are laterally offset to each other so that they are always associated with a yoke bolt 94 and are arranged between the associated yoke bolt 94 and a magnetic plug 78 or 80. A gap 96 thus magnetically decouples a yoke bolt from the magnetic plug 78 and the other gap 96 the magnetic plug 80 from the other yoke bolt 94. The upper yoke bolt 94 in FIG. 7b is thus magnetically associated with the magnetic plug 78, and the lower yoke bolt 94 with the magnetic plug 80 in order to each form a respective ferromagnetic circuit. Though a narrow connecting web 102 between the gaps 96 forms a kind of bridge, the latter is so narrow that no significant influence of the two ferromagnetic circuits occurs via this bridge and the two drives can act separately from each other.

The connecting web 102 permits the configuration of the yoke plates 90, 92 in one piece which simplifies their mounting. In case of two-part yoke plates, an additional adjustment step is required for aligning the parts with each other.

For the embodiments according to FIGS. 6 to 7 and for the remaining embodiments according to FIGS. 8 to 14, it can be advantageous to configure the yoke plates 90, 92 as sheet stacks, which means that the yoke plates 90, 92 are made of several layers of thin metal sheets. For the sake of simplicity, these metal sheets can be stamped as stacks.

Whereas the L-shaped gaps 96 in FIG. 7a run axially entirely through the yoke plates 90, 92, it is provided in the embodiment of FIG. 8 that the upper layer of the multilayered yoke plate 90 or 92 is configured without gaps (see FIG. 8b), whereas the underlying layers have a completely continuous gap 96 which is also configured without connecting web 102, such that the two ferromagnetic circuits are completely separated from each other in the lower layers. The upper layer is in particular made of a non ferritic material to not form any magnetic bridge.

With the embodiments according to FIGS. 7 and 8 the yoke bolts 94 are firmly connected at and with its longitudinal ends to the yoke plates 90, 92. The yoke bolts 94 are extending between the opposite (inner) end faces of the yoke plates 90, 92 and are attached to the plates 90, 92 at the opposite inner end faces, e.g. by clamping or soldering, welding etc. One axial end of the yoke bolts 94 can be in one piece (i.e. be integrally connected) with a yoke plate, i.e. the bolt merges at its end face into the opposite end face of the yoke plate.

In the embodiments according to FIGS. 9 to 14, a magnetic element in the form of a magnetic plate 104 which extends between the coils 74, 76 (see for example FIG. 9c) is provided for separating the ferromagnetic circuits, rather than two yoke bolts. The magnetic plate 104 extends axially between the yoke plates 90, 92 and is in contact therewith at its end faces at its longitudinal ends. The yoke plates 90, 92 have opposite (inner) end faces which contact the end faces of the magnetic plate 104 defining a so-called further magnetic element. Of course, the magnetic plate 104 can be attached with its opposite ends or opposite end faces to one or both yoke plates by clamping, welding, soldering, etc., or can be integral with one of the yoke plates at virtual opposite end faces. The coils 74, 76 can also contact, for example clamp the magnetic plate 104 at their narrowest location, wherein the insulating lacquer for insulating the coil wire must not be damaged.

The magnetic plate 104 presents wedge-shaped, thickened longitudinal edges as viewed in the axial direction A. These longitudinal edges have reference number 106. The wedge-shaped longitudinal edges 106 extend over the entire length of the magnetic plate 104 in the axial direction A of the coils 74, 76 and substantially fill the space between the outer envelope 108 of the coils 74, 76 and the coils 74, 76 resulting from the circular cylinder outer surface thereof.

In the embodiment according to FIG. 9, the yoke plates 90, 92 are not slotted.

In the embodiment according to FIG. 10a, the yoke plates 90, 92 of FIG. 7 are however used with appropriate gaps 96 such that in this connection, reference can be made to the explanations as to FIG. 7.

In the embodiment according to FIG. 11, the yoke plates 90, 92 of FIG. 8 are used in connection with the magnetic plate 104. No separate explanations are necessary here, either.

In the embodiment according to FIG. 12, the magnetic plate 104 is configured without thickened longitudinal edges but merely in a rectangular way. The yoke plates 90, 92 correspond to those of the embodiments according to FIG. 6.

The embodiment of FIG. 13 combines the magnetic plate 104 of FIG. 12 with the yoke plates 90, 92 of FIGS. 7 and 10.

The embodiment of FIG. 14 combines the magnetic plate 104 of FIG. 12 with the yoke plates 90, 92 of FIGS. 8 and 11.

The magnetic drives 10 shown in the figures have laterally a very small structure and thus not protrude from the basal face of the bottom 16 of the housing 12. As viewed in the axial direction A, the coils 74, 76 with their central axes are placed on the central axis M of the longitudinal housing 14, see FIG. 3. It can be seen that only the diagonal arrangement of the actuating elements 28, 30 permits the positioning of the coils 74, 76 on this central axis M to simultaneously obtain a compact construction.

The valve shown is preferably a pneumatic valve having two 3/2 directional valves.

The long lever arms on the rocker-like actuating elements 28, 30 permit the accommodation of the return springs 58.

During normal operation, a medium, for example air, is applied under pressure below the seat 40. The channel 42 which has a ventilating function in pneumatic valves is fluidically connected with the flow channel 52, the so-called working connection. Upon actuation of the associated coil 76, the valve seat 40 is opened by the spring 58 and the valve seat 38 is simultaneously closed. In this switching position of the solenoid valve, the channel 44 is fluidically connected with the flow channel 52.

However, in case the channel 42 is to be opened, the coil 76 is supplied with current, the magnetic core 82 or 64 is moved to the actuating element 28, 30, the actuating element 28, 30 pivots clockwise according to FIG. 4 and is lifted off from the valve seat 38. Due to the small magnetic influence of the two drives, the drive of a control chamber 24, 26 can be actuated independently of that of the other control chamber 26 or 24, respectively.

The diagonal arrangement of the actuating elements 28, 30 results in long lever arms and in small transverse movements, which improves the fluidic performance. The valve seats 40 arranged below the magnetic cores 82, 84 ensure a direct power transmission.

What is claimed is:

1. A solenoid valve comprising a magnetic drive having two spaced apart magnetic yoke plates,
   at least two parallel coils having end faces and being arranged with their end faces to lie between the two spaced apart magnetic yoke plates,
   a stationary magnetic plug and an axially movable magnetic core both being arranged in each coil, wherein the stationary magnetic plug and axially movable magnetic core within each coil, together with the magnetic yoke plates, forms a ferromagnetic circuit, and
   at least one further magnetic element having opposite ends, being firmly connected to a respective yoke plate on each of the opposite ends of the at least one further magnetic element, and being arranged between the magnetic yoke plates,
   wherein the magnetic element is configured as a magnetic plate, and
   wherein the magnetic plate has wedge-shaped thickened longitudinal edges extending over the entire length.

2. The solenoid valve according to claim 1, wherein the at least one magnetic element is arranged between the coils as viewed in an axial direction.

3. The solenoid valve according to claim 1, wherein the magnetic yoke plates are configured in a multilayered manner.

4. The solenoid valve according to claim 1, wherein two parallel magnetic yoke bolts are arranged between the magnetic yoke plates.

5. The solenoid valve according to claim 4, wherein the magnetic yoke plates have recesses, and wherein the ends of the two yoke bolts protrude in the recesses within the magnetic yoke plates.

6. A solenoid valve comprising a magnetic drive having two spaced apart magnetic yoke plates,
   at least two parallel coils having end faces and being arranged with their end faces to lie between the two spaced apart magnetic yoke plates,
   a stationary magnetic plug and an axially movable magnetic core both being arranged in each coil, wherein the stationary magnetic plug and axially movable magnetic core within each coil, together with the magnetic yoke plates, forms a ferromagnetic circuit, and
   at least one further magnetic element having opposite ends, being firmly connected to a respective yoke plate on each of the opposite ends of the at least one further magnetic element, and being arranged between the magnetic yoke plates, and
   wherein at least one of the magnetic yoke plates has an axial gap between the coils as viewed in an axial direction for minimizing a possibly present stray flux to the adjacent coil and wherein two parallel magnetic yoke bolts are arranged between the magnetic yoke plates and wherein the gap extends from a longitudinal edge of the yoke plate and partially extends about at least one of the two parallel magnetic yoke bolts as viewed in an axial direction.

7. The solenoid valve according to claim 6, further comprising a fluid housing, wherein the magnetic drive is connected to the fluid housing comprising two actuating elements which are each actuated by a magnetic core associated therewith.

8. The solenoid valve according to claim 7, wherein the fluid housing has recesses, and that the movable magnetic cores project through the recesses into the fluid housing to move the actuating elements.

9. A solenoid valve comprising a magnetic drive having two spaced apart magnetic yoke plates, at least two parallel coils having end faces and being arranged with their end faces to lie between the two spaced apart magnetic yoke plates, a stationary magnetic plug and an axially moveable magnetic core both being arranged in each coil, wherein the stationary magnetic plug and axially movable magnetic core within each coil, together with the magnetic yoke plates, forms a ferromagnetic circuit, and at least one further magnetic element having opposite ends, being firmly connected to a respective yoke plate on each of the opposite ends of the at least one further magnetic element, and being arranged between the magnetic yoke plates and, wherein at least one of the magnetic yoke plates has an axial gap between the coils as viewed in an axial direction for minimizing a possibly present stray flux to the adjacent coil, and, wherein at least one of the magnetic yoke plates has two gaps extending from opposite longitudinal edges of the magnetic yoke plate and extending along the magnetic element to then approach each other.

10. The solenoid valve according to claim 9, wherein the gaps have an L-shaped geometry.

11. A solenoid valve comprising a magnetic drive having two spaced apart magnetic yoke plates,
    at least two parallel coils having end faces and being arranged with their end faces to lie between the two spaced apart magnetic yoke plates,
    a stationary magnetic plug and an axially movable magnetic core both being arranged in each coil, wherein the stationary magnetic plug and axially movable magnetic core within each coil, together with the magnetic yoke plates, forms a ferromagnetic circuit, and
    at least one further magnetic element having opposite ends, being firmly connected to a respective yoke plate on each of the opposite ends of the at least one further magnetic element, and being arranged between the magnetic yoke plates,
    wherein the magnetic yoke plates are stamped sheet stacks, and
    wherein at least one of the magnetic yoke plates has an axial gap between the coils and wherein the gap is axially not continuous and extends only through some sheet metal layers.

* * * * *